United States Patent [19]

Gaines

[11] 4,088,740

[45] May 9, 1978

[54] AMMONIA PRODUCTION

[75] Inventor: Larry D. Gaines, Bartlesville, Okla.

[73] Assignee: Phillips Petroleum Company, Bartlesville, Okla.

[21] Appl. No.: 739,761

[22] Filed: Nov. 8, 1976

[51] Int. Cl.² .............................................. C01C 1/04
[52] U.S. Cl. ................................ 423/359; 23/230 A; 23/232 R; 23/253 A; 23/255 R; 423/361; 423/362
[58] Field of Search ............... 423/359, 360, 361, 362; 23/230 A, 253 A, 255 R, 255 E

[56]     References Cited
         U.S. PATENT DOCUMENTS

| | | | |
|---|---|---|---|
| 2,512,586 | 6/1950 | Stengel | 423/359 X |
| 3,420,630 | 1/1969 | Braun | 423/361 X |
| 3,676,066 | 7/1972 | Pennington | 423/359 |
| 3,993,447 | 11/1976 | Buss et al. | 23/253 A X |

OTHER PUBLICATIONS

Strelzoff et al., "Advances in Petroleum Chemistry and Refining", vol. 9, 1964, pp. 316–349.

Primary Examiner—Edward J. Meros

[57] ABSTRACT

A process for the synthesis of ammonia is provided in which the ammonia production is optimized by an automatic control; a predetermined relationship between the equilibrium ammonia-concentration and the outlet ammonia-concentration is controlled; stable operation at a temperature near the temperature of maximum conversion is made possible thereby although the process conditions may vary.

12 Claims, 9 Drawing Figures

AMMONIA PRODUCTION

This invention relates to ammonia production. More specifically this invention relates to the catalytic conversion of nitrogen and hydrogen to ammonia. Particularly, this invention is concerned with the automatic control of ammonia synthesis processes.

BACKGROUND OF THE INVENTION

The conversion of nitrogen and hydrogen under high pressure is one of the oldest commercial chemical processes. This process consists in reacting a hydrogen/nitrogen mixture over a catalyst at elevated temperatures and pressures. The ammonia synthesis reaction is exothermic and the high temperature in the reactor is sustained by the heat of reaction through the use of indirect heat exchangers in which the feed stream and the product stream are put into indirect heat exchange relationship. Computers have been proposed in the area of ammonia synthesis plant control.

Under a given set of operating conditions, the ammonia production and the corresponding heat developed are at a maximum for a specific temperature. Both above and below this temperature, the amount of ammonia produced is smaller and, correspondingly, the amount of heat developed is smaller. If the feed stream is preheated in order to bring it to reaction temperatures by the heat developed in the ammonia synthesis process, this operation cannot be carried out in a stable manner below the "blow-out" temperature. At a temperature below this "blow-out" temperature, the heat developed by the reaction is smaller than the heat consumed, thus the reaction is quenched and finally stops.

The temperature at which the maximum conversion occurs and the temperature below which the process described is not stable are not fixed temperatures but depend upon various process parameters, the pressure and the feed stream composition being two of the more important ones.

THE INVENTION

It is thus one object of this invention to provide a process for the production of ammonia that is automatically controlled near an optimum conversion temperature.

Another object of this invention is to provide an ammonia synthesis process utilizing a multiple-bed reactor and a simple control system.

Further objects, advantages, details, embodiments and features of this invention will become apparent to those skilled in the art from the following detailed description of the invention, the appended claims and the drawings in which:

In accordance with this invention, I have now found that an ammonia synthesis process of the kind described above can be efficiently controlled by maintaining a predetermined relationship between an equilibrium concentration signal being representative of the equilibrium concentration under the given process parameters and an outlet ammonia-concentration signal being representative of the actual ammonia-concentration of the product leaving the ammonia synthesis reactor. Responsive to this relationship between the two ammonia-concentration signals, the temperature profile in the reactor is automatically manipulated.

More specifically, my process for the production of ammonia by catalytic conversion of a nitrogen/hydrogen gas mixture comprises passing a feed stream containing nitrogen and hydrogen through a reactor in contact with an ammonia synthesis catalyst under ammonia-forming conditions to generate a product stream having a greater ammonia-concentration than said feed stream, preheating at least a part of the fed stream before it contacts the catalyst by the heat developed by the ammonia-forming reaction, automatically generating an equilibrium signal representative of the equilibrium ammonia-concentration under the prevailing process conditions, automatically generating an outlet concentration signal representative of the actual ammonia-concentration in the product stream under the prevailing process conditions, automatically comparing the equilibrium signal and the outlet concentration signal with respect to a predetermined relationship of these two signals and generating a control signal responsive thereto, and finally automatically manipulating the temperature profile in the reactor responsive to the control signal to maintain the predetermined relationship between the outlet-ammonia concentration and the equilibrium ammonia-concentration.

The process conditions of the ammonia synthesis process of this invention are generally in the following ranges:

| | |
|---|---|
| Temperature | 600 – 1000° F (reaction temperature) |
| Pressure | 100 – 600 atm |
| Hourly Space Velocity (CF per CF per hour) | 5000 – 80,000 |
| Feed Stream Composition (Mole %, converter feed) | |
| Nitrogen Concentration | 8 – 40 |
| Hydrogen Concentration | 25 – 80 |
| Ammonia Concentration | 1 – 10 |
| Inerts Concentration | 0 – 30 |

The equilibrium signal is generated representative of the equilibrium ammonia-concentration which is determined from the prevailing process parameters as follows:

The following measured values are utilized in the calculation:

T: The temperature in the reaction zone, particularly the temperature in the bottom of the fourth bed, in degrees Kelvin.

P: The pressure in the reaction zone, particularly the pressure in the fourth bed, in atm.

$m_{NH_3}$: The actual concentration of ammonia in the feed stream, normally determined from the separator conditions (temperature, pressure, inert concentration) by utilizing the charts disclosed by Gianfranco Guerreri in his article "Find $NH_3$ Recycle Gas Equalibrium" (Hydrocarbon Processing, Dec. 1970, pp. 74–76).

$m_A$: The mole concentration of argon in the feed stream after removal of $NH_3$, determined normally by a gas chromatograph.

$m_{CH_4}$: The mole concentration of methane in the feed stream after removal of $NH_3$, determined normally by a gas chromatograph.

r: The mole ratio of hydrogen to nitrogen in the feed stream after $NH_3$ removal, normally determined, e.g., by a gas chromatograph.

$m_{NH_3}$: An assumed value for the equilibrium ammonia-concentration.

(During the actual control cycle, this value of $m_{NH_3}$ is the previously calculated equilibrium ammonia-concentration.)

The sequence of calculations to obtain the equilibrium ammonia-concentration is as follows:

The following values in the equations shown are calculated in the sequence given:

$$\log Ka = -2.691122 \log T - 5.519265 \times 10^{-5} T + 1.848863 \times 10^{-7} T^2 + 2001.6/T + 2.6899 \quad (1)$$

$$m_{Af} = \frac{m_A}{1 + m_{NH_3f}} \quad (2a)$$

$$m_{CH_4f} = \frac{m_{CH_4}}{1 + m_{NH_3f}} \quad (2b)$$

$$i_o = \frac{m_{Af} + m_{CH_4f}}{1 + m_{NH_3f}} \quad (2c)$$

$$C_{N_2f} = \frac{1 - m_{Af} - m_{CH_4f} - m_{NH_3f}}{r + 1} \quad (3)$$

$$C_{H_2f} = C_{N_2f} \cdot r \quad (4)$$

$$h = \frac{1}{3} \cdot \frac{C_{H_2f} + \frac{3}{2} m_{NH_3f}}{C_{N_2f} + \frac{1}{2} m_{NH_3f}} \quad (5)$$

$$b_1 = \frac{i_o + \frac{1}{2} + \frac{1}{2} h}{1 - i_o} \quad (6a)$$

$$b_2 = \frac{i_o - \frac{1}{2} + \frac{3}{2} h}{1 - i_o} \quad (6b)$$

$$a = \frac{3h}{3h + 1}(1 - i_o) \quad (6c)$$

$$m_{H_2} = a(1 - b_1 m_{NH_3}) \quad (7a)$$

$$m_{N_2} = \frac{a}{3h}(1 - b_2 m_{NH_3}) \quad (7b)$$

$$m_{A1} = (1 - m_{NH_3} - m_{H_2} - m_{N_2}) \cdot \frac{m_{Af}}{m_{Af} - m_{CH_4f}} \quad (7c)$$

$$m_{CH_41} = 1 - m_{NH_3} - m_{H_2} - m_{N_2} - m_{A1} \quad (7d)$$

$$\text{sum} = m_{H_2} \cdot A_{OH_2}^{0.5} + m_{N_2} \cdot A_{ON_2}^{0.5} + m_A{}^A O_A{}^{0.5} + m_{NH_3} \cdot A_{ONH_3}^{0.5} + m_{CH_4} \cdot A_{OCH_4}^{0.5} \quad (8)$$

$$a_{H_2} = m_{H_2} \cdot P \cdot \exp\left\{[B_{OH_2} - A_{OH_2}/RT - C_{H_2}/T^3 + (A_{OH_2}^{0.5} - \text{sum})^2 \frac{1}{RT}] \frac{P}{RT}\right\} \quad (9a)$$

$$a_{N_2} = m_{N_2} \cdot P \cdot \exp\left\{[B_{ON_2} - A_{ON_2}/RT - C_{N_2}/T^3 + (A_{ON_2}^{0.5} - \text{sum})^2 \frac{1}{RT}] \frac{P}{RT}\right\} \quad (9b)$$

$$a_{NH_3} = m_{NH_3} \cdot P \cdot \exp\left\{[B_{ONH_3} - A_{ONH_3}/RT - C_{NH_3}/T^3 + (A_{ONH_3}^{0.5} - \text{sum})^2 \frac{1}{RT}] \frac{P}{RT}\right\} \quad (9c)$$

$$K_a^2 = \frac{a_{NH_3}^2}{a_{N_2} \cdot a_{H_2}^3} \quad (10)$$

In these equations the abbreviations used have the following meanings:

$m_{Af}$: Argon concentration in the feed $m_{CH_4f}$: Methane concentration in the feed $i_o$: Inerts concentration in the feed assuming total ammonia dissociation $C_{N_2f}$: Nitrogen concentration in the feed $C_{H_2f}$: Hydrogen concentration in the feed $m_{H_2}$: The concentration of hydrogen that would be present at equilibrium $m_{N_2}$: The concentration of nitrogen that would be present at equilibrium $m_{A1}$: Argon concentration that would be present at equilibrium $m_{CH_41}$: Methane concentration that would be present at equilibrium $R$: The gas constant $A_{oi}, B_{oi}$, and $C_i$ ($i$ standing for $H_2$, $N_2$ and $NH_3$, respectively) The activity coefficient constants which can be found in Anders Nielsen, "An Investigation on Promoted Iron Catalysts for the Synthesis of Ammonia," 3rd Ed., Jul. Gjellerups Forlag, p. 81.

$h, b_1, b_2, a,$ sum are intermediate constants used in the further calculations.

The calculation in equation (1) and equation (10) will result in two values for $Ka$, the equilibrium constant. If these two values of $Ka$ are the same, the assumed equilibrium ammonia-concentration ($m_{NH_3}$) is the actual equilibrium ammonia-concentration. If the two constants are not the same, the calculation is repeated for a new assumed value of $m_{NH_3}$, which, in case of the value $Ka$ from equation (10) being larger than the value $Ka$ obtained from equation (1), will be a value smaller than the value used for the first calculation. This approximation is repeated until a value of $Ka$ in equation (10) is obtained that is close enough to the value of $Ka$ obtained in equation (1). Thus, when the two values of $Ka$ are the same, $m_{NH_3}$ equals $C_{NH_3eq}$. The accuracy of this calculation is limited by the accuracy of the measurement of the temperature, the pressure and the various concentrations.

After the equilibrium ammonia-concentration ($C_{NH_3eq}$) has been obtained as described, the outlet concentration of ammonia is preferably calculated. This calculation can be done as follows:

$$C_{NH_3out} = \frac{m_{NH_3f} + (T_p - T_F)c_p/ - \Delta HR}{1 - (T_p - T_F)c_p/ - \Delta HR} \quad (11)$$

This formula is valid only if there are no external heat withdrawals. Otherwise the formula has to be amended to take those into consideration. In this formula, $C_{NH_3out}$ is the calculated ammonia-concentration in the product stream. $T_p$ is the temperature of the product stream leaving the heat exchanger, $T_F$ is the temperature of the feed stream entering the reactor, $c_p$ is the average thermal capacity of the feed stream which is a function of the outlet temperature, the inlet temperature, the outlet pressure, the inlet pressure and inlet composition. $\Delta HR$ is the heat generated by the ammonia synthesis at a temperature $T_p m_{NH_3f}$ is the ammonia concentration of the feed stream; the same value utilized for the calculation of the equilibrium ammonia-concentration above. For all practical purposes, $c_p$ can be used as a constant. $\Delta HR$ is the heat of reaction developed by the synthesis of one mole $NH_3$ from hydrogen and nitrogen. This $\Delta$ $HR$ is a function of temperature and pressure. The value for $\Delta HR$ utilized is a constant value computed at $T_p$.

$C_{NH_3 f}$ can be determined by measuring the ammonia-concentration of the feed stream or preferably as described above, utilizing the published charts and finding the value of $C_{NH_3 f}$ for the given conditions of temperature, pressure and inerts concentration.

As indicated above, the assumed value of $m_{NH_3}$, in the approximation for the equilibrium ammonia-concentration, is the value of the actual equilibrium ammonia-concentration as determined in the previous control cycle. The predetermined relationship between the equilibrium ammonia-concentration and the outlet ammonia-concentration depends upon the specifics of the process involved. It has been found that it is presently preferred that a good control in standard ammonia synthesis processes be obtained by controlling the ratio of the outlet ammonia-concentration to the equilibrium ammonia-concentration at a constant value. This constant value (abbreviated RS infra) can, for example, be 0.935. The predetermined relationship between these two concentrations, namely the outlet concentration and the equilibrium concentration of ammonia can, however, also be controlled so that the difference between equilibrium concentration and outlet concentration is a constant value, e.g., 0.9 mole %. Whereas the two relatiohships mentioned above between the outlet concentration and the equilibrium concentration are preferred, it is possible to utilize other relationships, particularly if certain process conditions are separately controlled or if they vary in particularly wide ranges.

In the following, the preferred embodiments of this invention are described.

Various possibilities exist to manipulate the reactor temperature profile responsive to the control signal generated. The preferred way of manipulating the temperature profile in the ammonia synthesis reactor is to adjust the inlet temperature of the feed stream. This in turn is preferably done by splitting the feed stream into a first and a second portion and passing the second portion into indirect heat exchange with the product stream and adjusting the relative quantities of the feed stream in the first, and respectively, second portion thereof responsive to the control signal.

In the case where a reactor having a plurality of catalyst beds through which the reacting materials flow consecutively is utilized, the temperature profile manipulation responsive to the control signal can be carried out in the following way. It has been found that the temperature in the last layer of catalyst of such a multi-layer reactor (e.g., the fourth layer of a four-layer reactor) is of particular criticality in the amount of ammonia produced. Thus the control process of this invention can be carried out by generating a control signal that is representative of the relationship of the equilibrium ammonia-concentration and the actual outlet ammonia-concentration, and is converted into a temperature control signal for controlling the temperature of the last bed. The temperature of this last bed is sensed and a temperature signal is generated. From the two ammonia-concentrations, the equilibrium ammonia-concentration and the actual outlet ammonia-concentration, a temperature setpoint signal is generated. These two temperature signals are then compared to result in the ultimate control signal. The temperature setpoint signal is calculated from the equilibrium ammonia-concentration signal and the actual outlet ammonia-concentration signal in accordance with the following relationship:

$$T_{s\,new} = T_{s\,old} + (RS - \frac{C_{NH_3 out}}{C_{NH_3 eq}}) \times G \quad (12)$$

In this formula RS is the desired ratio $C_{NH_3 out}/C_{NH_3 eq}$, G is a constant related to sample time, process dynamics and controller dynamics, $C_{NH_3 eq}$ is the equilibrium ammonia-concentration and $C_{NH_3 out}$ is the ammonia-concentration in the product stream both calculated as described. $T_{s\,new}$ is the new temperature setpoint signal for, e.g., the fourth bed to be used. $T_{s\,old}$ is the temperature setpoint signal used before the present control cycle. Responsive to the control signal in this instance, either the inlet temperature of the entire feed stream can be controlled or, as another possibility, the quench stream introduced into the top of the last bed in the reactor can be controlled.

A further possibility, in this last-mentioned case of an ammonia synthesis reactor having a plurality of beds, is to manipulate the temperature of the inlet gas stream to the last bed of the reactor. In this embodiment, the temperature at the inlet to the last catalyst bed is sensed and a temperature signal is generated, and correspondingly from the equilibrium concentration signal and the outlet ammonia-concentration signal, a temperature setpoint for this inlet temperature is generated. From the comparison of these temperatures, the control signal is generated. This control signal in turn is utilized again either to adjust the temperature of the feed stream entering the top of the reactor, or to adjust the flow of the quench stream into the last bed or to carry out both adjustments. In the preferred process of this invention, a reactor with a plurality of catalyst beds is used and the feed stream is divided into a first and a second portion. The first portion of the feed stream then is subdivided into a plurality of partial streams. Each partial stream is introduced into the reactor at the inlet of a different catalyst bed. The second portion of the feed stream is passed through indirect heat exchange to be preheated by indirect heat exchange by the heat generated by the exothermic ammonia synthesis.

The invention will still be more fully understood from the following description of the drawing in which several details and elements of preferred embodiments of the invention are shown.

Figure 1:
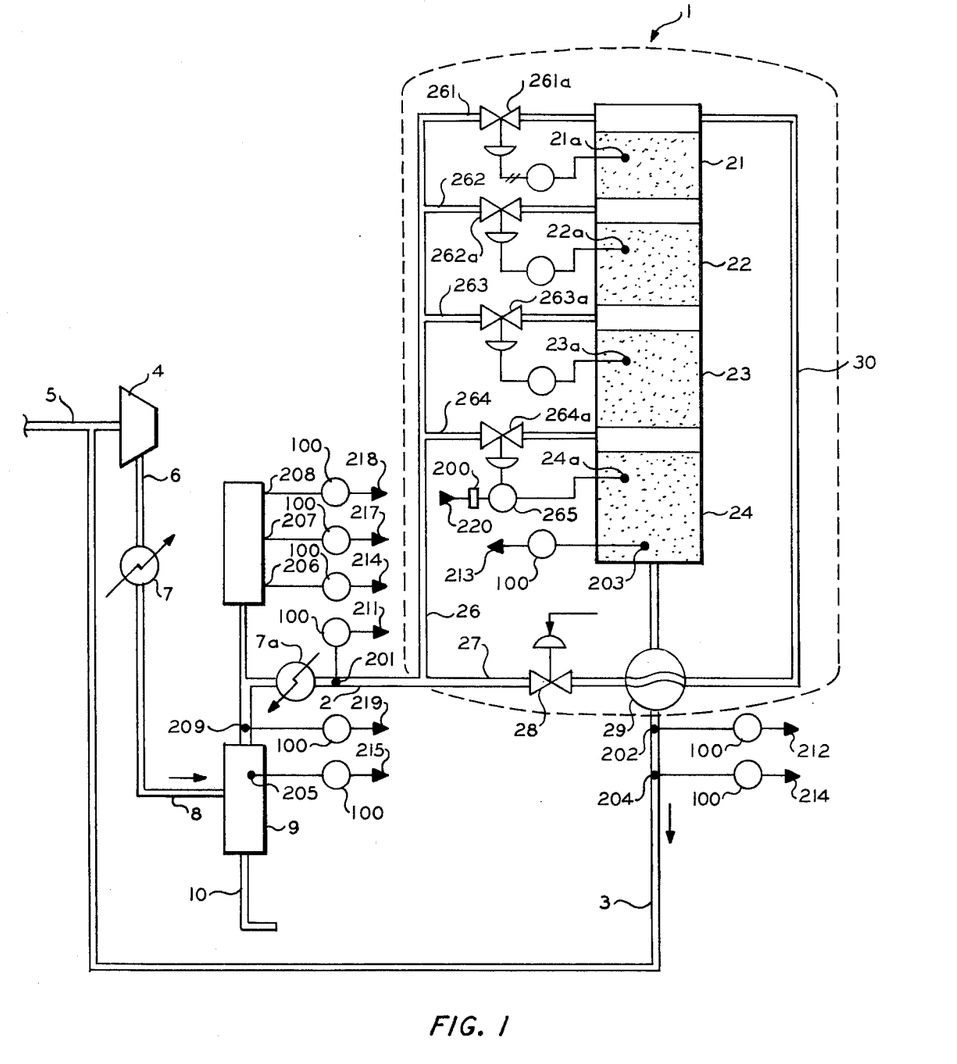
FIG. 1 is a schematic diagram for the process of this invention.

FIG. 1 schematically shows a flow stream for an ammonia synthesis process. In a reactor 1 a gas stream introduced via pipe 2 and consisting essentially of a nitrogen, hydrogen, ammonia and inerts is contacted at elevated temperature and pressure conditions with a catalyst to form ammonia. Ammonia synthesis catalysts as such are known. Examples for such catalysts are iron catalyst and promoted iron catalysts.

The effluent from the reactor 1, containing more ammonia than the feed stream, is passed via pipe 3 to a compressor 4. In this compressor 4, the effluent from the reactor together with a fresh stream introduced via pipe 5 and consisting essentially of nitrogen, hydrogen, and inerts is compressed. The high-pressure effluent from the compressor is passed via pipe 6 to a cooler 7. The cooled high-pressure effluent comprises liquid ammonia and gaseous nitrogen, hydrogen, etc. This effluent is passed via pipe 8 to an ammonia separator 9. The liquid ammonia contained in the effluent stream in pipe 8 is withdrawn as the product of the process via pipe 10.

The gaseous part leaving the separator 9 is passed via a heater 7a as the feed stream to the reactor 1.

The ammonia converter 1 has four beds 21, 22, 23 and 24. The feed stream in line 2 is split into a first portion flowing through pipe 26 and a second portion flowing through pipe 27. The quantity of feed stream flowing through pipe 27 is controlled by a valve 28. The controller for the valve 28 is not shown in the drawing. The feed stream flowing through valve 28 flows further through heat exchanger 29 in which this second portion of the feed stream is put into indirect heat exchange relationship with the effluent from the last catalyst bed 24. The thusly preheated second portion of the feed stream is introduced into the top of the reactor via pipe 30. The first portion of the feed stream in pipe 26 is split into four different streams flowing through pipe 261, 262, 263 and 264, respectively. These four pipes are each provided with a control valve 261a, 262a, 263a, and 264a. The temperature in the top of each of the four catalyst beds 21, 22, 23 and 24, respectively, is measured by thermocouples 211, 221, 231 and 241, respectively. Responsive to the temperatures measured in the layers 21, 22 and 23, the corresponding valves 261a, 262a, and 263a are opened or closed such as to maintain a predetermined temperature in these three beds. The valve 264a to the last bed is manipulated by controller 265 in response to the temperature in the last bed as measured by thermocouple 24a. The setpoint for the temperature controller 265 is calculated in computer 300. The temperature at the bottom of the fourth bed is sensed by thermocouple 203 and the respective computer input is 213. The temperature controller 265 manipulates the valve 264a responsive to the temperature in the top of the fourth bed 24 as sensed by the thermal element 24a and the temperature setpoint furnished by the computer output 220 and transmitted via the digital-to-analog converter 200 to the setpoint input of the controller 265.

Typical operating data for an ammonia synthesis loop as shown in FIG. 1 are given in the following table.

TABLE

| Composition of feed stream in line 2 in mole percent | |
|---|---|
| Ammonia | 2 |
| Nitrogen | 20 |
| Hydrogen | 60 |
| Inerts | 18 |
| Composition of the product stream in pipe 3 in mole percent | |
| Ammonia | 12 |
| Nitrogen | 17.3 |
| Hydrogen | 51.8 |
| Inerts | 18.9 |
| Temperature of the product in line 3 | 580° F |
| Pressure of the product in line 3: | 127 atm |
| Pressure of the gas in line 6: | 133 atm |
| Temperature of the gas in line 8: | −13° F |
| Temperature in the separator: | −10° F |
| Ammonia Production | 600 tons per day. |

The process of the present invention involves a specific control which will be explained in more detail now in connection with FIG. 1. The parameters of the process that are determined are the following:

The temperature of the feed stream in pipe 2 is measured by a thermocouple 201. The temperature of the product stream is measured by a thermocouple 202. The temperature in the bottom of the fourth bed 24 of the converter 1 is measured by a thermocouple 203. The temperature in the top of the fourth bed 24 of the converter 1 is measured by thermocouple 24a. The pressure of the gas leaving the converter 1 in pipe 3 is measured by a pressure transducer 204. The composition of the feed entering the reactor is measured in a gas chromatograph 11. This gas chromatograph measures and delivers signals for the following values: $m_A$, mole concentration of argon, signal 206; $m_{CH_4}$, mole concentration methane, signal 207; $r$, the mole ratio of hydrogen-to-nitrogen, signal 208. The concentration of the ammonia in the feed stream 2 finally can be determined by measuring the temperature in the ammonia separator by means of thermocouple 205 and the pressure in a pressure transducer 209. These temperature measurements, together with the signals representing the total inerts concentration in line 21, are converted into a signal representative of the ammonia-concentration in the feed stream. Frequently the temperature in the ammonia separator 9 is kept constant and a constant value for $m_{NH_3f}$ is used and no temperature measurement is needed. All the input signals from the various thermal elements, pressure transducers, etc., are converted to digital signals by an analog-to-digital converter having up to 256 inputs. Such an analog-to-digital converter is commercially available, e.g., under the trademark Analogic, MP2814—5D2C from the Analogic Corporation. For every one of the process parameters determined, the analog-to-digital converter 100 is shown separately. It is, however, to be understood that this analog-to-digital converter is one unit with a multitude of inputs. The digital-computer inputs corresponding to the various parameters are shown in the drawing as 211, 212, 213, 214, 215, 216, 217 and 218, corresponding to the features 201, 202, 203, 204, 205, 206, 207 and 208.

Figure 2:
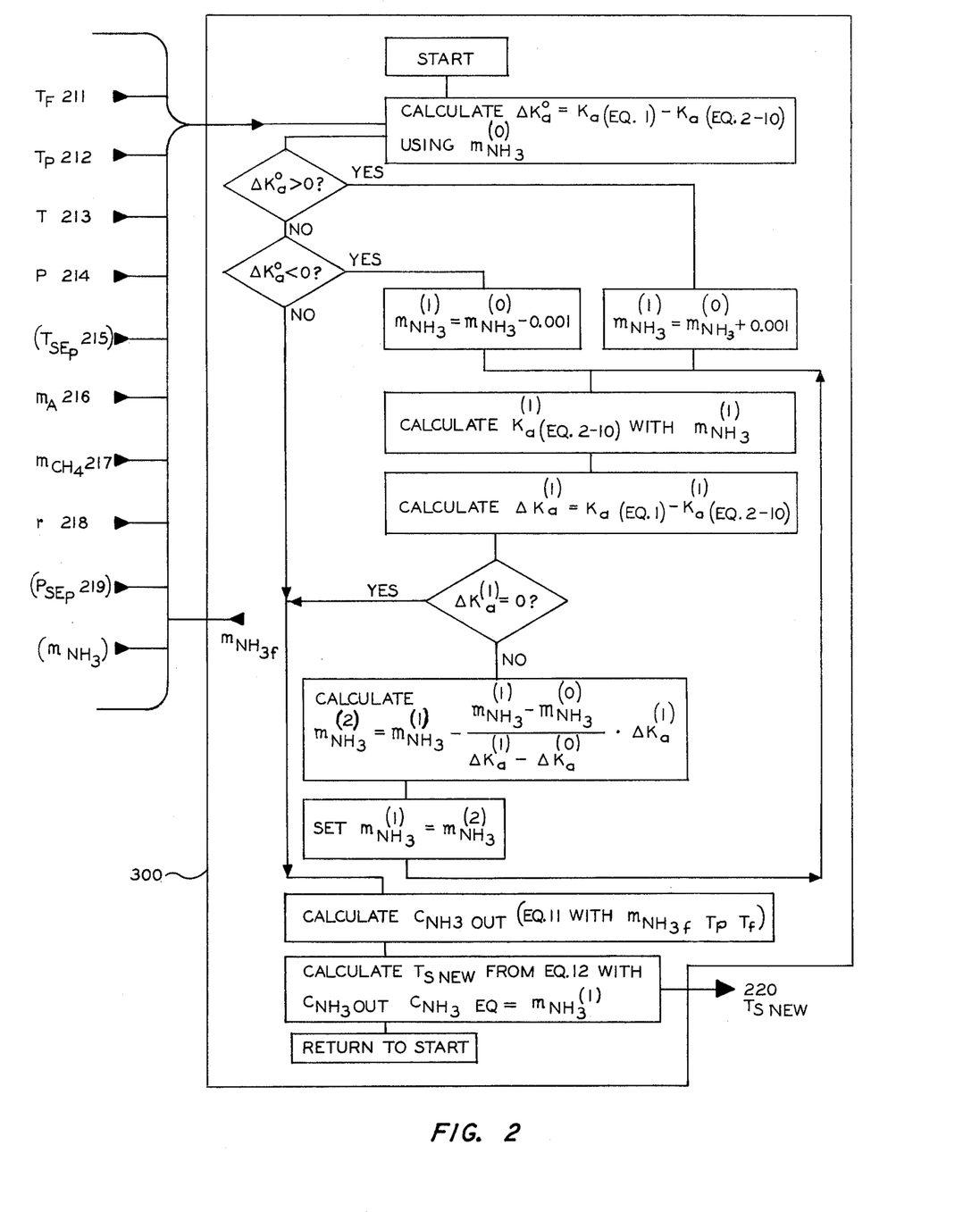
FIG. 2 is the computer flow diagram for the control program.

In the following, the actual control operation is explained. FIG. 2 shows the basic logic followed to determine the control signal.

As illustrated in FIG. 2, the computer 300 carries out various calculations and compares them in order to finally deliver a setpoint signal at its output 220. As indicated above, the ammonia-concentration in the feed stream $m_{NH_3f}$ is either utilized as a constant value or is determined by the computer based on the concentration of inerts in the feed stream, the temperature of the separator and the pressure of the separator. In FIG. 2 the separator temperature and pressure input are thus shown in parenthesis. $m_{NH_3f}$ is used as a constant stored in the computer memory.

The actual calculation of the setpoint $T_{s\ new}$ is carried out by first calculating a first $Ka$ from equation 1. Thereafter, based on the various parameters, a second value $Ka$ is calculated utilizing the sequence of equations 2 to 10 and an assumed value $m_{NH_3}$ for the equilibrium ammonia-concentration. This assumed value under normal operation is the value obtained during the previous cycle. Therefore, $m_{NH_3}$ is shown in parenthesis in FIG. 2. The thus obtained second $Ka$ thereafter is compared to the first $Ka$. In case the first $Ka$ value is larger than the second $Ka$ value, the value of $m_{NH_3}$ is increased by, e.g., 0.001. Similarly, if the first $Ka$ value is smaller than the second $Ka$ value, the assumed value $m_{NH_3}$ is decreased by, e.g., 0.001. The calculation of $Ka$ by equations 2-10 is repeated. Then $\Delta Ka^{(1)}$ being the difference between the $Ka$ (eq. 1) and the new $Ka^{(1)}$ (eq. 2-10) is calculated. If $\Delta Ka^{(1)}$ is not zero, a new $m_{NH_3}^{(2)}$ is calculated by the Newton approximation shown in FIG. 2. Then the calculation is repeated until $\Delta Ka$ is zero. Then the respective $m_{NH_3}$ is stored and used as the equilibrium ammonia-concentration value of this cycle. Thereafter, the outlet ammonia-concentration ($C_{NH_3out}$) is calculated in accordance with equation 11, then the value $T_{s\ new}$ is calculated in accordance with equation 12, and this value is transferred to the output 220. Thereafter, the control cycle is repeated.

In order to show the calculation steps 1, 2 and 7 in actual values, the following calculated example is presented:

$T$: 738° F (temperature in reaction zone)
$P$: 127.5 atm (pressure at converter output)
$R$: 0.08206 atm cc/kmol °K (the universal gas constant)
$T_f$: 300° F (feed stream temperature)
$T_p$: 568° F (the temperature of the product stream in line 3)
$c_p$: 7.6 BTU/lb mole/° F
$\Delta HR$: −22,800 BTU/lb mole $NH_3$
$r$: 1.9 (hydrogen to nitrogen mole ratio from analyzer)
$m_A$: 0.0626 moles argon/cc
$m_{CH_4}$: 0.0798 moles methane/cc From the temperature in the separator 9 being −10° F, the pressure being 127.5 atm and the content of inerts in the feed stream being 14.25%, the tables of Guerreri referred to above result in a feed-stream concentration of 2.3%; thus $m_{NH_3f}$: 0.023 mole % ammonia With all these values, the value for $Ka$ is obtained by means of the first equation:

$Ka = 0.00555$
$Ka^2 = 0.00003080$

The various values in the equations 2-9 are obtained utilizing the input values shown above:

$m_{Af}$: 0.0612 (equation 2a)
$m_{CH_4f}$: 0.078 (equation 2b)
$i_o$: 0.1361 (equation 2c)
$C_{N_2f}$: 0.2889 (equation 3)
$C_{H_2f}$: 0.549 (equation 4)
$h$: 0.6458 (equation 5)
$b1$: 1.6325 (equation 6a)
$b2$: 0.70008 (equation 6b)
$a$: 0.5698 (equation 6c)
$m_{H_2}$: 0.4526 (equation 7a)
$m_{N_2}$: 0.2682 (equation 7b)
$m_{Af}$: 0.0686 (equation 7c)
$m_{CH_4l}$: 0.0846 (equation 7d)
sum: 0.9127 (equation 8 with the constants shown in the above-quoted Nielsen reference)
$a_{H_2}$: 60.35 (equation 9a)
$a_{N_2}$: 36.35 (equation 9b)
$a_{NH_3}$: 15.71 (equation 9c)

With the three values for $a$, obtained in accordance with equations 9a, 9b and 9c above, a second value $Ka^2$ is obtained in accordance with equation 10. This value is $Ka^2$: 0.0000309

A comparison of this value with the value for $Ka^2$ obtained in accordance with equation 1 shows that the two values are sufficiently close. The assumed value $m_{NH_3}$ of 0.1260 thus is the equilibrium ammonia-concentration.

$C_{NH_3out}$: 0.123 (equation 11)

With the value of 0.126 for the equilibrium ammonia-concentration and 0.123 for the output ammonia-concentration, the ratio of the output ammonia-concentration to the equilibrium ammonia-concentration calculates to be 12.3:12.6 or 0.976. With this value and a given setpoint RS of, e.g., 0.935, the new setpoint for the temperature $T_{snew}$ is calculated in accordance with equation 12.

The new setpoint can be obtained by means of a proportional-integral or a proportional-integral-derivative controller or an adaptive dead-time controller may be used to compute SP.

The calculations indicated in FIG. 2 are carried out by the computer responsive to a master program. This master program is normally incorporated in a larger control program over the entire plant. Generally, however, it is convenient to carry out the calculations indicated and thus eventually manipulate the value 264a responsive to the changed setpoint with time intervals of about 6 seconds.

In order to still further illustrate the invention, the following computer simulation results are shown and discussed. The behavior of an ammonia synthesis reactor having four beds of catalyst has been simulated and calculated on a computer based on the parameters shown in the following table.

| Process Parameters for Computer Simulation | |
|---|---|
| Inlet Pressure | 140.0 atmospheres |
| Outlet Pressure | 140.0 atmospheres |
| Feed Temperature | 290.0° F |
| $H_2$ Feed | 10243.0 lb moles/hr |
| $N_2$ Feed | 3414.0 lb moles/hr |
| $NH_3$ Feed | 330.0 lb moles/hr |
| Argon Feed | 727.0 lb moles/hr |
| $CH_4$ Feed | 1817.5 lb moles/hr |
| Fraction Feed through Exchanger | 0.58 |
| Fraction Feed for First Bed Quench | 0.03 |
| Fraction Feed for Second Bed Quench | 0.12 |
| Fraction Feed for Third Bed Quench | 0.12 |
| Fraction Feed for Fourth Bed Quench | 0.15 |
| Outlet Temperature of Bed 1 | 897.9° F |
| Outlet Temperature of Bed 2 | 891.8° F |
| Outlet Temperature of Bed 3 | 880.0° F |
| Outlet Temperature of Bed 4 | 859.5° F |
| Mole Fraction Inerts in Converter Feed | 0.154 |
| $H_2/N_2$ Ratio | 3.0 |
| Mole Fraction Ammonia in Feed | 0.023 |
| Mole Fraction Ammonia in Effluent | 0.1265 |

Figure 3:
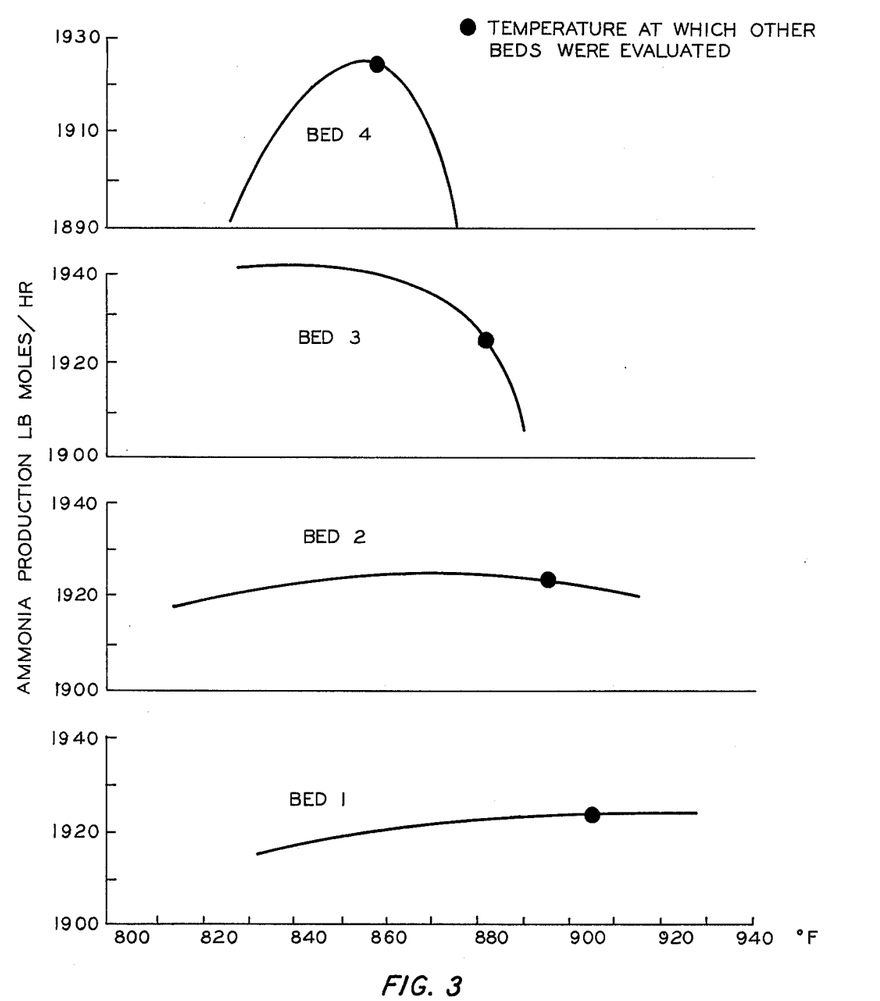
FIGS. 3-9 are diagrams of data obtained from computer simulation of the ammonia process.

In the first simulation test, the effect of the outlet temperature of the individual beds was determined. In these simulation runs, the temperatures of three beds were held constant and the temperature of the remaining bed was varied by changing flow distributions through the quench lines. The effects of the temperature of the four beds are shown in FIG. 3. As can be readily seen, the temperatures in the first three beds are of only small influence on the ammonia production, whereas the temperature in the fourth bed is of significant influence on the ammonia production.

In FIGS. 4-9, simulation results are plotted showing the mole fraction ammonia versus the outlet bed temperature for variations of process parameters.

Figure 4:
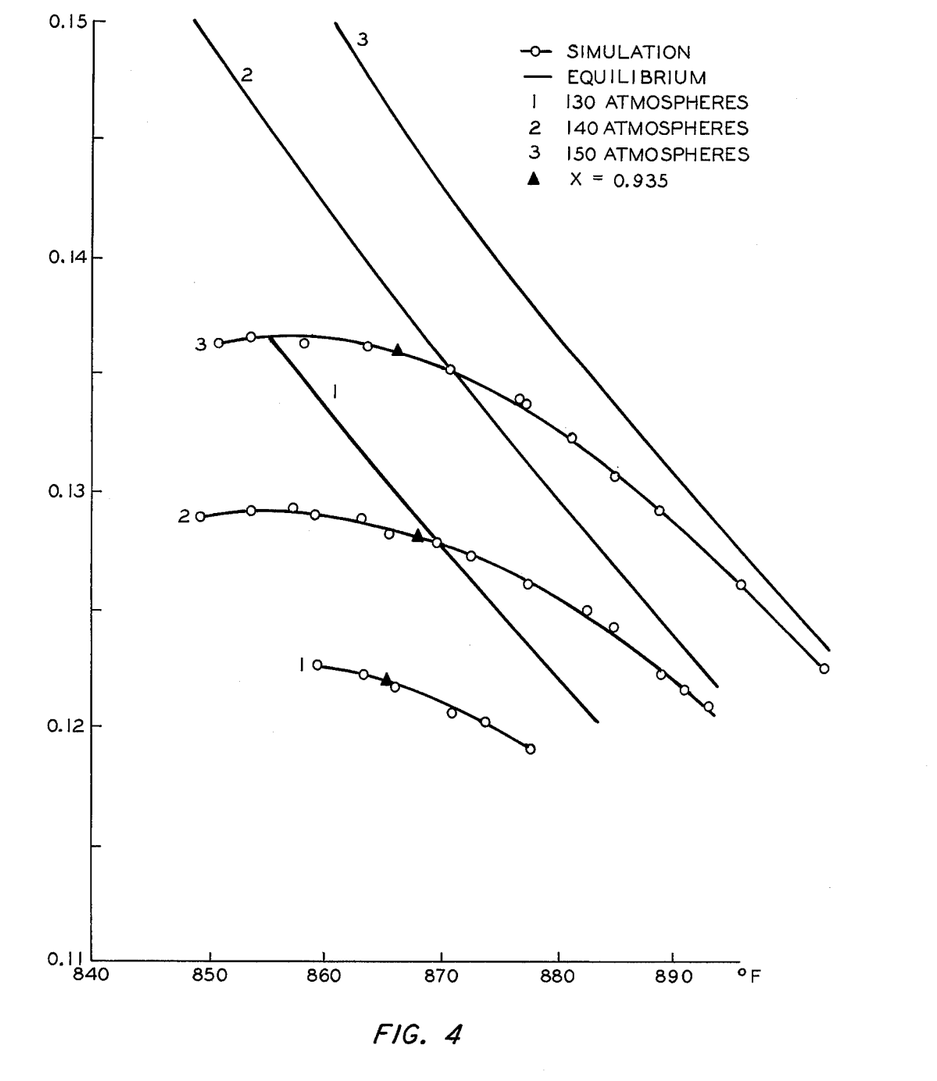

A series of simulations was carried out to determine how the mole fraction of ammonia as a function of the temperature of the outlet of the last bed was influenced by the pressure in the reactor. The respective curves are shown in FIG. 4. The points on the three curves characterized by a small triangle are those points at which the ratio of the actual mole fraction of ammonia to the equilibrium concentration of ammonia as calculated had a value of $X = 0.935$. As can be seen from these curves for all three pressure conditions, a control of the process at a ratio of the two concentrations of 0.935 would result in stable control since the desired operating temperature for this would be sufficiently high above the temperature at which this system becomes instable.

Figure 5:
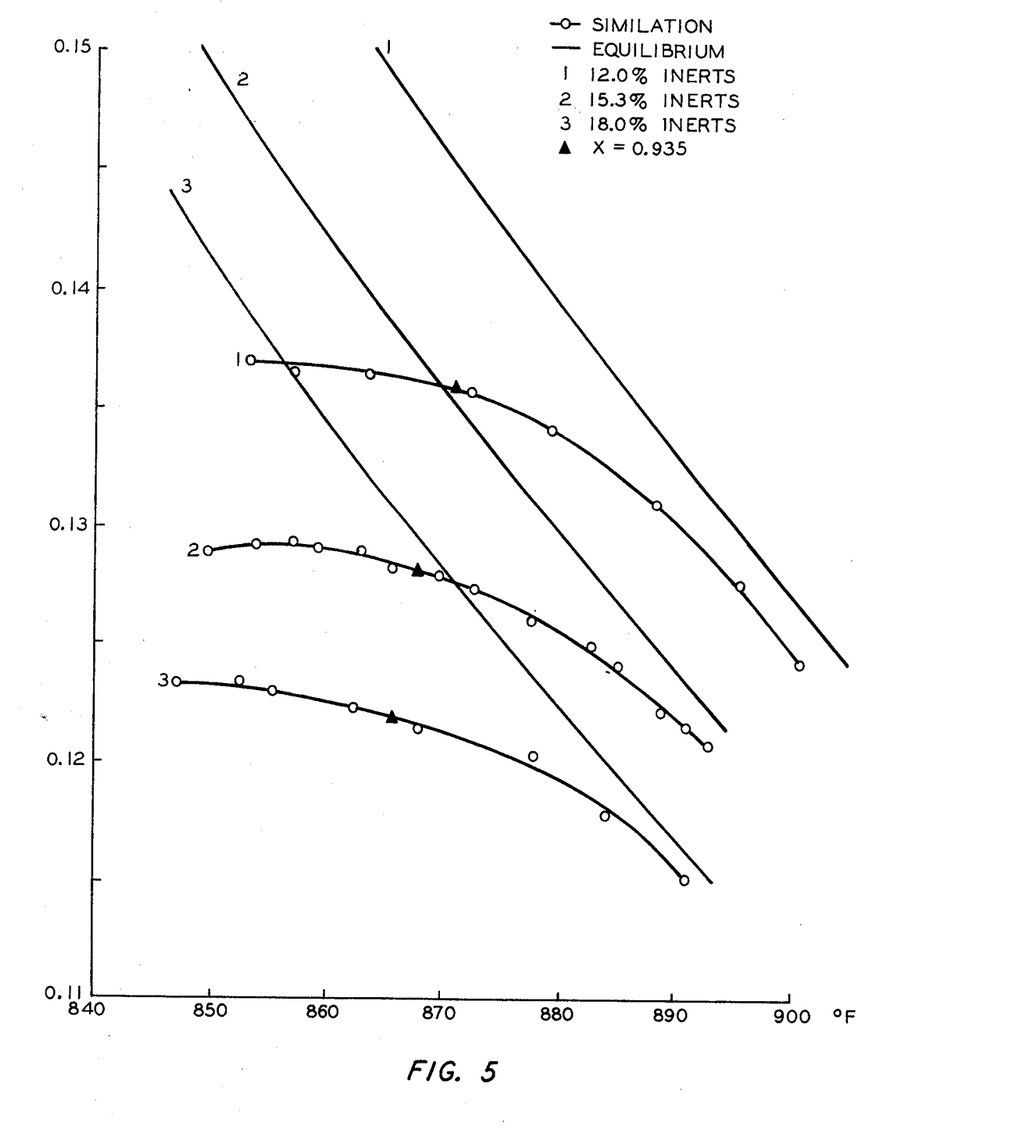

A further simulation was calculated to determine again the mole fraction of ammonia in the reactor effluent as a function of the temperature in the last bed under varying concentration of inerts in the stream of the reactor. The results of this simulation are shown in FIG.

5. As expected, the mole fraction of ammonia is the highest with the lowest level of inerts. Again the small triangles indicate the points where the ratio of the actual ammonia-concentration to the equilibrium ammonia-concentration for the respective inert content is 0.935. From the location of these points, it can be seen again that the process can be controlled in a stable manner by keeping the ratio of the actual ammonia-concentration in the product stream to the equilibrium concentration at a fixed constant value of 0.935 regardless of the inerts concentration.

Figure 6:
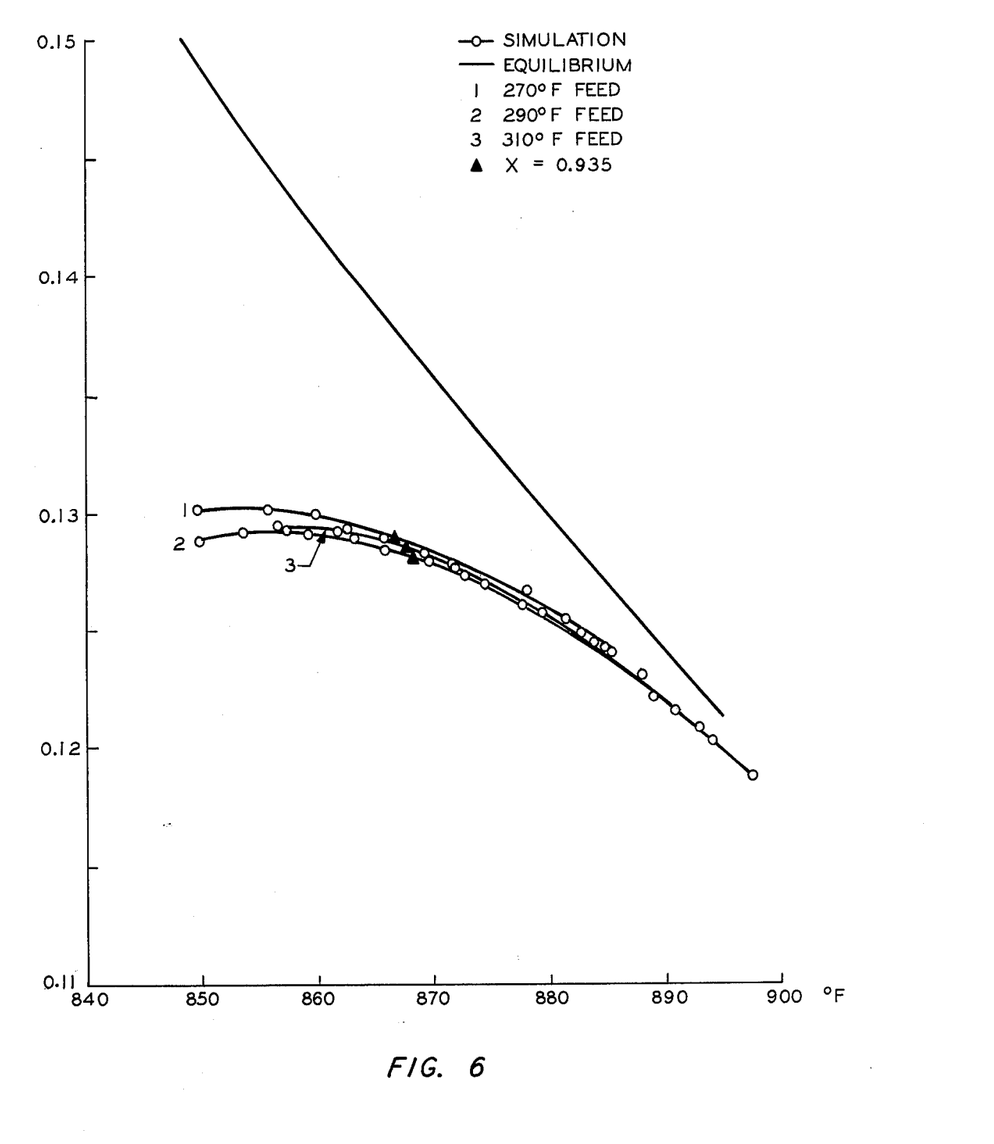

The results of the simulation carried out by the computer to determine the dependency of the ammonia mole fraction in the product stream on the feed temperature are shown in FIG. 6. As can be seen, the feed temperature had little or no influence on the mole fraction of ammonia in the outlet and, as can be seen from the operating points characterized by the small triangles, the process again can be controlled under stable conditions by keeping the ratio of the outlet ammonia-concentration to the equilibrium ammonia-concentration at a constant ratio of 0.935.

Figure 7:
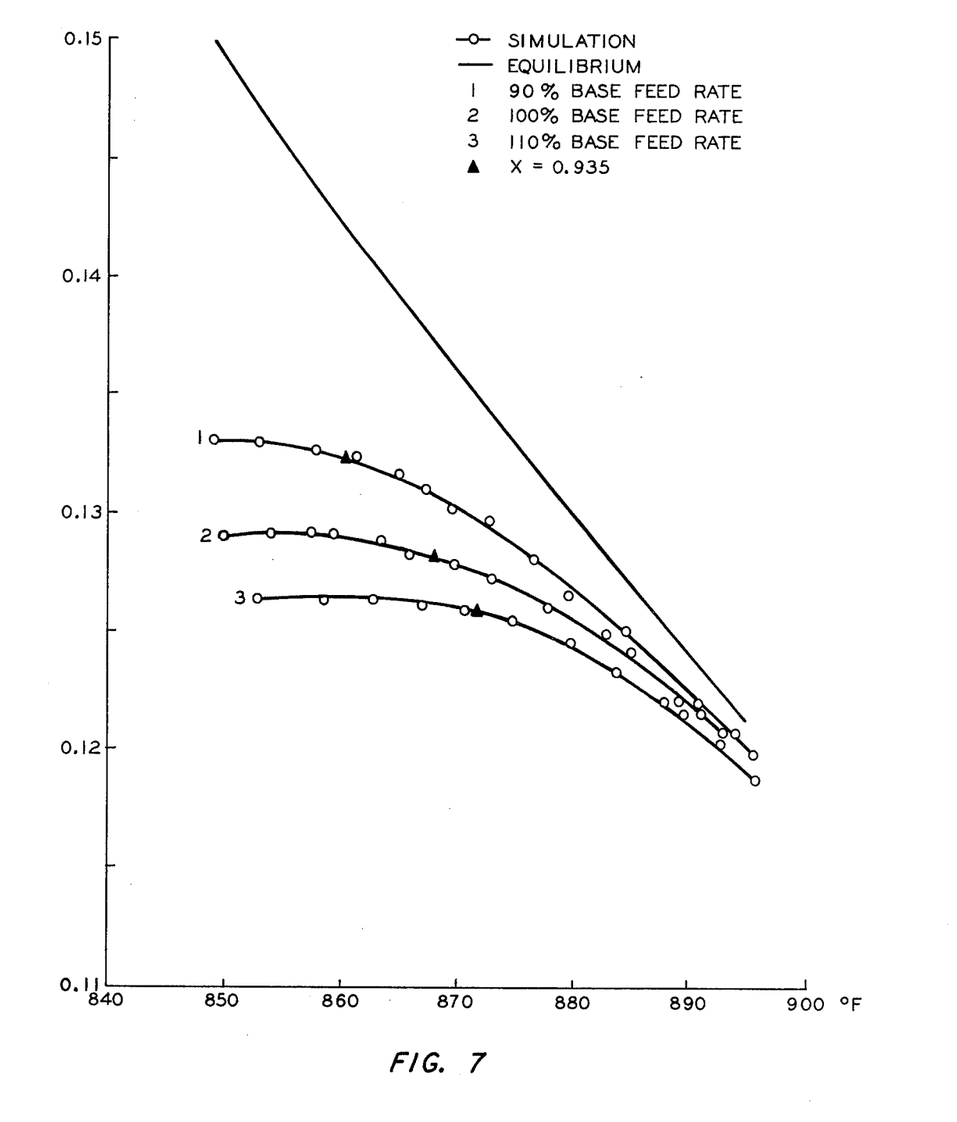

The next simulation, the results of which are shown in FIG. 7, was carried out by the computer to determine the influence of the change in the feed rate. Simulation curve 2 is the curve obtained by utilizing the feed rate as shown in the table above, whereas curves 1 and 3 utilize a feed rate that is 10% above or 10% below the base feed rate. The ammonia-concentration increases with lower feed rates, i.e., with longer contact times with the catalyst. Again the operating points characterized by the small triangle are those where the ratio of the actual ammonia-concentration to the equilibrium concentration is 0.935. These points are all in the stable region of the process and again the process can be controlled by keeping the ratio of the actual ammonia-concentration in the outlet or product stream to the equilibrium ammonia-concentration at the constant value of 0.935.

Figure 8:
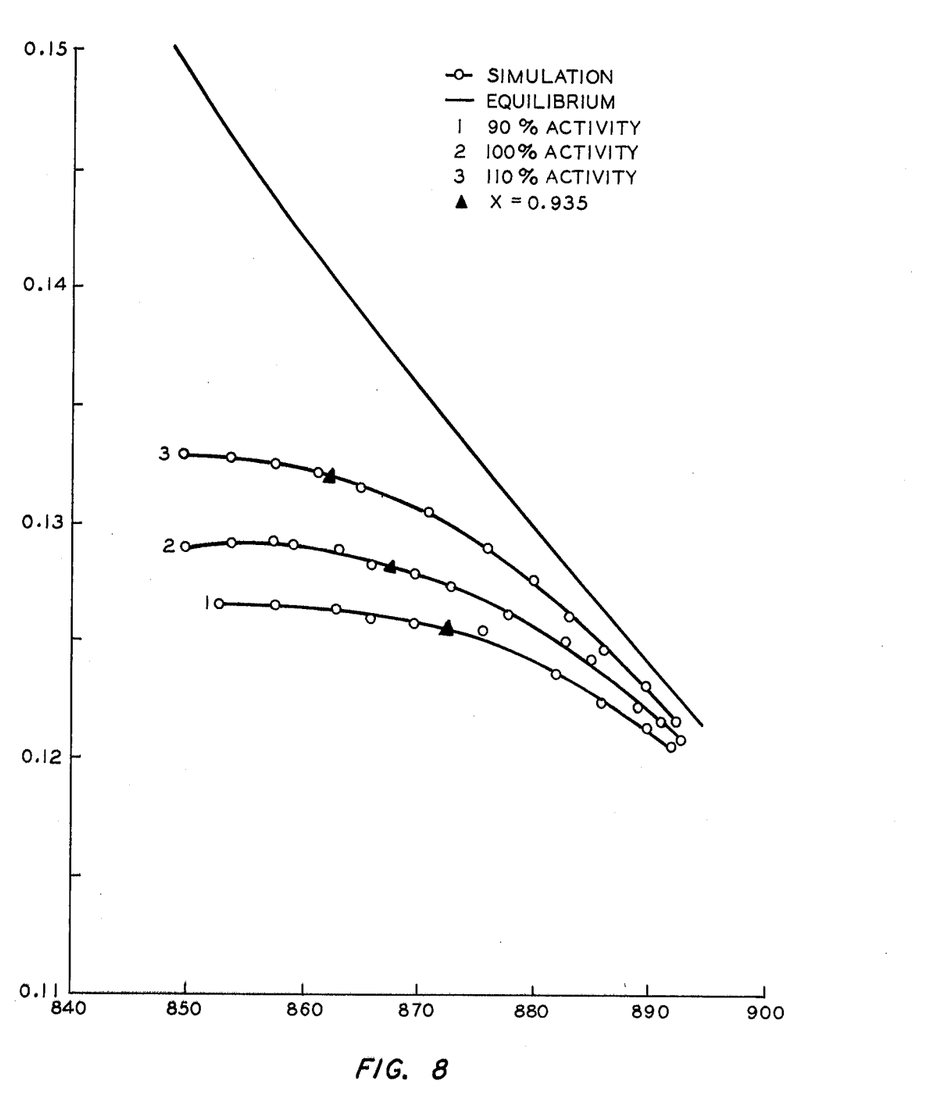

The effect of the catalyst activity upon the ammonia concentration has been calculated in a simulation on a computer and the results are shown in FIG. 8. The mole concentration of ammonia is greater the greater the activity of the catalyst is. The three operating points characterized by the small black triangle again are those where the ratio of the actual ammonia-concentration to the equilibrium ammonia-concentration is 0.935, and the location of these points again indicates that the process can be controlled in a stable manner by keeping the ratio of these two concentrations at this constant value.

Figure 9:
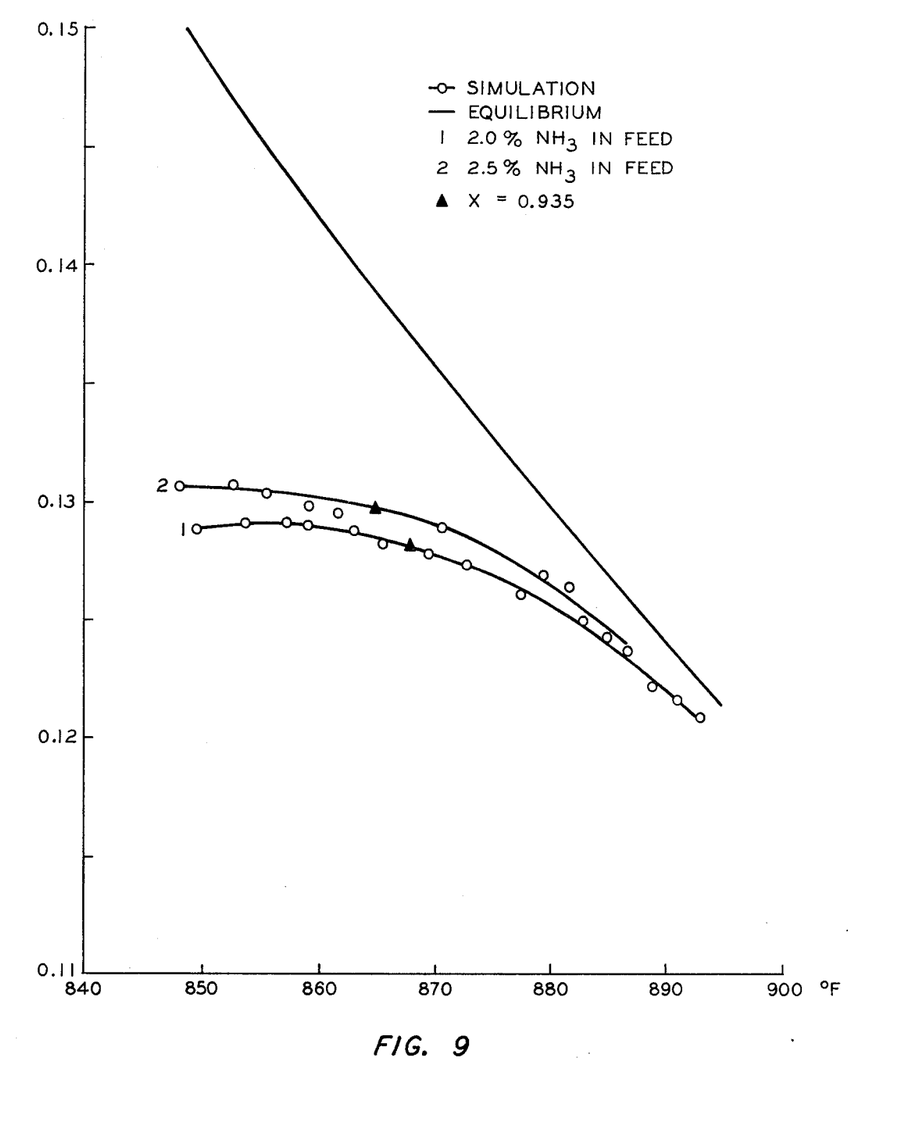

The influence of the ammonia-concentration in the feed gas stream finally was determined by simulation experiments on the computer and the results are shown in FIG. 9. Although the mole fraction of ammonia in the product stream is higher for 2.5% ammonia in the feed stream than for 2.0% ammonia in the feed stream, the net result is that the ammonia production is reduced when the ammonia content in the feed stream is increased. Again the two operating points characterized by the small black triangle are those for which the ratio of the actual ammonia-concentration to the equilibrium ammonia-concentration is 0.935. The location of these operating points again shows that controlling the ratio of the two ammonia-concentrations to be a constant value of 0.935 results in a stable control of the ammonia synthesis.

Reasonable variations and modifications, which will become apparent to those skilled in the art, from the above description can be made in this invention without departing from the spirit and scope thereof.

I claim:
1. A process for the production of ammonia by catalytic conversion of a nitrogen and hydrogen-containing gas mixture comprising
   a. passing a feed stream containing nitrogen and hydrogen through a reactor in contact with an ammonia synthesis catalyst under ammonia-forming conditions to generate a product stream having a higher ammonia-concentration than the feed stream,
   b. preheating at least part of the feed stream before it contacts the catalyst,
   c. generating an equilibrium signal representative of the equilibrium ammonia-concentration under the prevailing process parameters,
   d. generating an outlet concentration signal representative of the actual ammonia-concentration in said product stream under the prevailing process parameters,
   e. comparing the equilibrium signal and the outlet concentration signal and generating a control signal responsive thereto, and
   f. manipulating the temperature profile in the reactor responsive to the control signal to maintain a predetermined relationship between the actual ammonia-concentration and the equilibrium ammonia-concentration.

2. A process in accordance with claim 1 wherein said part of said feed stream is preheated by the heat developed by the ammonia-forming reaction.

3. A process in accordance with claim 1 wherein the ratio between said outlet concentration signal and said equilibrium signal is automatically calculated and a ratio signal is generated, wherein said ratio signal is compared to a ratio setpoint signal and said control signal is automatically generated responsive thereto.

4. A process in accordance with claim 1 wherein said feed stream is sequentially passed through a plurality of catalyst beds arranged within said reactor, wherein a quench gas stream is introduced upstream of each bed into said reactor to control the temperature of the respective bed and wherein said reactor temperature profile is manipulated responsive to said control signal by adjusting the flow of quench gas stream introduced into said reactor upstream of the last catalyst bed to control the temperature of this last catalyst bed to remain at a given setpoint.

5. A process in accordance with claim 1 wherein said temperature profile of said reactor is manipulated by adjusting the temperature of the feed stream introduced into the reactor.

6. A process in accordance with claim 4 wherein said quench gas streams have essentially the same composition as said feed stream.

7. A process in accordance with claim 5 wherein said feed stream is divided into a first and into a second portion, wherein said second portion of said feed stream is passed into indirect heat exchange with the product stream and wherein the relative quantities of the feed stream in said first portion and said second portion are controlled responsive to said control signal.

8. A process in accordance with claim 7
   wherein said first portion of said feed stream is subdivided into a plurality of partial streams, wherein said reactor comprises several catalyst beds through which said feed stream is sequentially passed, wherein each partial stream is introduced into the reactor at the inlet of a different bed in order to quench the reaction in this bed and to control the temperature in this bed.

9. A process in accordance with claim 2 wherein said reactor comprises a plurality of catalysts beds, wherein said feed stream is divided into a preheat stream and a plurality of partial streams, wherein said preheat stream is passed into indirect heat exchange with the product stream, wherein the preheat stream thereafter is passed into the reactor and into contact with the catalyst of the first catalyst bed, wherein each of said plurality of partial streams is introduced upstream of a different catalyst bed in order to control the temperature of the respective bed by the quenching action of the respective partial stream, wherein the inlet temperature of the last bed is determined and a last bed inlet temperature signal is generated, wherein said control signal of step (e) is converted into a temperature control signal for controlling the temperature of the last bed known as the last bed inlet temperature setpoint signal, and wherein responsive to the last bed inlet temperature signal and the last bed inlet temperature setpoint signal, the flow of the partial stream into the reactor just upstream of the last bed is manipulated to result in an inlet temperature of the last bed that corresponds to the last bed inlet temperature setpoint signal.

10. A process in accordance with claim 9 wherein the inlet temperature of every bed is determined and an inlet bed temperature signal is generated, and wherein the flow of gas in the partial stream injected just upstream of the respective bed is controlled responsive to the respective bed inlet temperature signal.

11. A process in accordance with claim 1 wherein said product stream and a synthesis gas stream containing as the main ingredients nitrogen and hydrogen are compressed to form a compressed gas stream, wherein said compressed gas stream is cooled to form a cooled compressed gas, wherein a liquid ammonia-comprising product stream and a gaseous overhead stream are separated from said cooled compressed gas stream, wherein said product stream is recovered, wherein said gaseous overhead stream is heated and then introduced into said reactor as said feed stream.

12. A process according to claim 4 wherein:
the temperature of the last bed is determined and a last bed temperature signal is generated,
said control signal is converted into a temperature control signal for controlling the temperature of the last bed known as the last bed temperature setpoint signal,
and wherein responsive to the last bed temperature signal and the last bed temperature setpoint signal, the flow of said quench gas stream into said reactor upstream of the last catalyst bed is adjusted to result in a last bed temperature that corresponds to the last bed temperature setpoint signal.

* * * * *